(12) United States Patent
Sato

(10) Patent No.: US 12,186,671 B2
(45) Date of Patent: Jan. 7, 2025

(54) COMPUTER-READABLE NON-TRANSITORY STORAGE MEDIUM HAVING GAME PROGRAM STORED THEREIN, GAME APPARATUS, GAME PROCESSING METHOD, AND GAME SYSTEM

(71) Applicant: NINTENDO CO., LTD., Kyoto (JP)

(72) Inventor: Shintaro Sato, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 273 days.

(21) Appl. No.: 17/875,830

(22) Filed: Jul. 28, 2022

(65) Prior Publication Data
US 2023/0044065 A1    Feb. 9, 2023

(30) Foreign Application Priority Data
Aug. 4, 2021  (JP) .................................. 2021-128445

(51) Int. Cl.
A63F 13/798   (2014.01)
A63F 13/69    (2014.01)
A63F 13/847   (2014.01)

(52) U.S. Cl.
CPC ............ *A63F 13/798* (2014.09); *A63F 13/69* (2014.09); *A63F 13/847* (2014.09)

(58) Field of Classification Search
CPC ....... A63F 13/69; A63F 13/798; A63F 13/847
See application file for complete search history.

(56) References Cited

U.S. PATENT DOCUMENTS 10,729,982 B2    8/2020  Konno
2008/0161078 A1*  7/2008  Nakano ................... A63F 13/30
                                                 463/7
2014/0274404 A1*  9/2014  Hoskins ................ A63F 13/335
                                                 463/42

(Continued)

FOREIGN PATENT DOCUMENTS

CN    111275347 A  *  6/2020
CN    115348888 A  * 11/2022 ........... A63F 13/352

(Continued)

OTHER PUBLICATIONS

Feb. 6, 2024 Office Action issued in Japanese Patent Application No. 2021-128445, pp. 1-4 [machine translation included].

*Primary Examiner* — Milap Shah
(74) *Attorney, Agent, or Firm* — Nixon & Vanderhye P.C.

(57) ABSTRACT

A competitive game in which a user and an opponent participate is executed, and a rating based on a match record of the competitive game is stored. When an update condition that, after last update, the user wins the competitive game a predetermined number of times that is two or more or the user loses the competitive game a predetermined number of times that is two or more, is satisfied, a temporary change amount of a rating parameter is calculated on the basis of a match record of each competitive game until the update condition is satisfied this time after the last update. If the temporary change amount is equal to or larger than a predetermined threshold, the temporary change amount is determined as a change amount of the rating parameter, and if the temporary change amount is less than the predetermined threshold, the threshold is determined as a change amount of the rating parameter, and the rating is updated.

21 Claims, 7 Drawing Sheets

(56) References Cited

U.S. PATENT DOCUMENTS

2020/0324209 A1* 10/2020 Konno .................. A63F 13/44

FOREIGN PATENT DOCUMENTS

| JP | 2011-217762 | | 11/2011 |
|----|-------------|---|---------|
| JP | 2014144367 A | * | 8/2014 |
| JP | 2021-104158 | | 7/2021 |
| WO | 2018/042468 | | 3/2018 |

* cited by examiner

F I G. 1
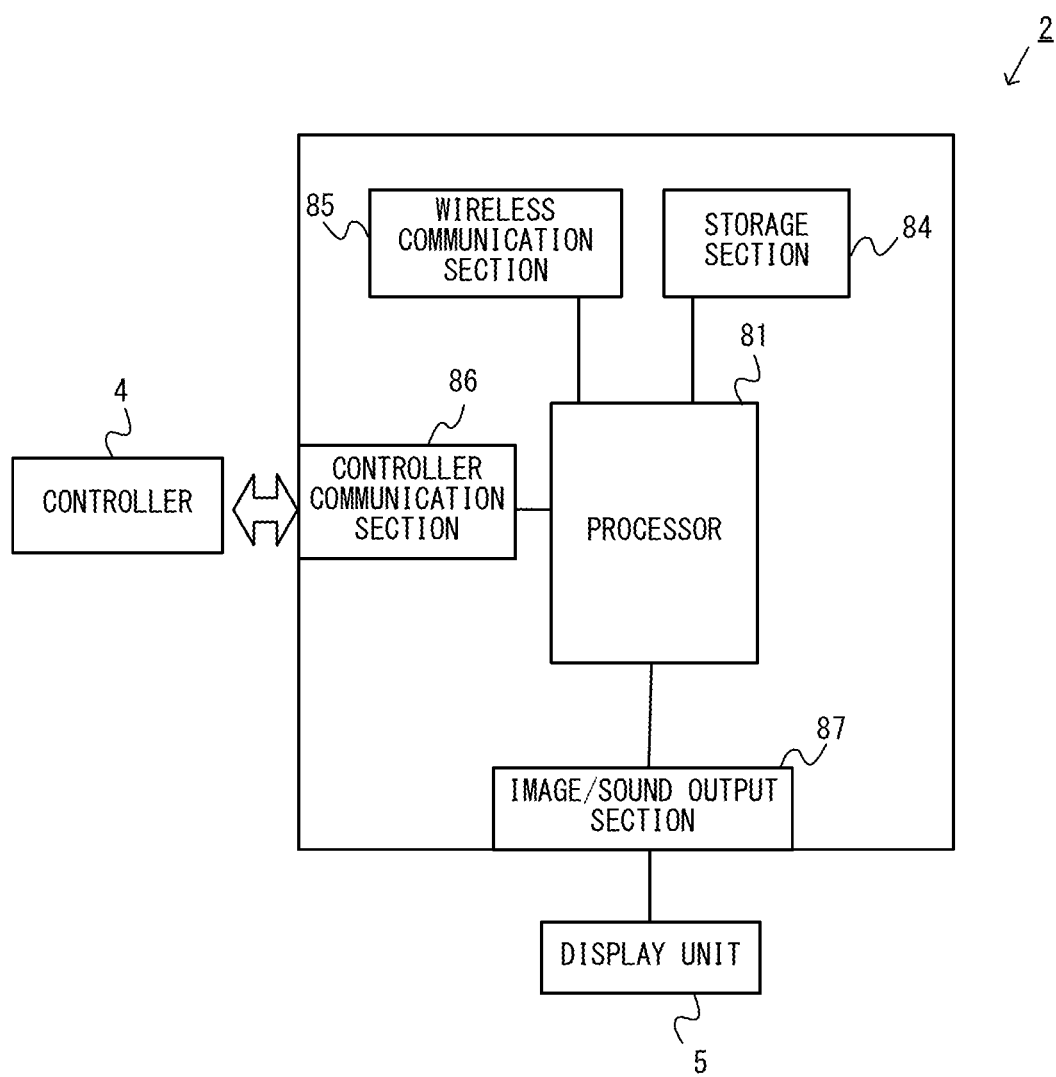

COMPUTER-READABLE NON-TRANSITORY STORAGE MEDIUM HAVING GAME PROGRAM STORED THEREIN, GAME APPARATUS, GAME PROCESSING METHOD, AND GAME SYSTEM

CROSS REFERENCE TO RELATED APPLICATION

This application claims priority to Japanese Patent Application No. 2021-128445 filed on Aug. 4, 2021, the entire contents of which are incorporated herein by reference.

FIELD

The present disclosure relates to a computer-readable non-transitory storage medium having a game program stored therein, a game apparatus, a game processing method, and a game system which execute a competitive game using a rating system.

BACKGROUND AND SUMMARY

Conventionally, a competitive game in which a competition against another user is performed has been known. In addition, among such competitive games, a competitive game in which a rating is increased or decreased every competition according to the win-loss result of the competition has also been known.

In the above-described competitive game, depending on the difference between the rating of the user and the rating of the opponent, even if the user wins, the change amount of the rating may become excessively small.

Therefore, it is an object of the present disclosure to provide a computer-readable non-transitory storage medium having a game program stored therein, a game apparatus, a game system, and a game processing method which realize a rating system that produces a rating change that is satisfactory to a user.

In order to attain the object described above, for example, the following configuration examples are exemplified.

A configuration example is directed to a computer-readable non-transitory storage medium having stored therein instructions that, when executed by a processor of an information processing apparatus, cause the processor of the information processing apparatus to:
  execute a competitive game in which a user and an opponent participate;
  store a rating parameter based on a match record of the competitive game of the user, in a storage section;
  update the rating parameter when an update condition that is a condition regarding update of the rating parameter and is a condition that, after last update, the user wins the competitive game a predetermined number of times that is two or more or the user loses the competitive game a predetermined number of times that is two or more, is satisfied; and
  when performing the update,
    calculate a temporary change amount of the rating parameter on the basis of a match record of each competitive game executed until the update condition is satisfied this time after the rating parameter is updated last time,
    determine the temporary change amount as a change amount of the rating parameter if the calculated temporary change amount is equal to or larger than a preset threshold,
    determine the threshold as a change amount of the rating parameter if the calculated temporary change amount is less than the threshold, and
    update the rating parameter stored in the storage section, on the basis of the determined change amount.

According to the above configuration example, the rating parameter is updated at the timing when a series of competitions are performed. Furthermore, when performing this update, a change amount of the rating parameter based on the series of competitions is calculated as a temporary change amount, and, if the temporary change amount is equal to or larger than a predetermined threshold, the temporary change amount is used as an actual change amount of the rating parameter as it is. In addition, if the temporary change amount is less than the predetermined threshold, the threshold is used as an actual change amount of the rating parameter. That is, a win-loss result is not reflected in the rating parameter every competition, and update is performed on the basis of a result of the series of competitions while correcting the change amount. Accordingly, it is possible to provide a rating system that prevents the user from being given an impression that the change amount of the rating is small and that provides a high sense of satisfaction to the user. In addition, it is also possible to prevent the rating parameter from being excessively large for the rating system as a whole.

In another configuration example, the instructions may further cause the processor of the information processing apparatus to, when performing the update, calculate the temporary change amount according to the rating parameter of the opponent and the rating parameter of the user in each competitive game executed until the update condition is satisfied, and determine the change amount on the basis of the temporary change amount.

According to the above configuration example, the rating difference between the user and the opponent can be reflected in the magnitude of the change amount.

In another configuration example, the instructions may further cause the processor of the information processing apparatus to, when performing the update, calculate the temporary change amount for the competitive game in which the user wins, such that, if the rating parameter of the user is larger than the rating parameter of the opponent, the temporary change amount is smaller as a difference between the rating parameters of the opponent and the user is larger.

According to the above configuration example, the change amount when the user wins against an opponent for which the user has a high winning percentage is set to a small amount. Accordingly, the content of the rating as an index indicating the ability of the user for the competitive game can be made appropriate.

In another configuration example, the instructions may further cause the processor of the information processing apparatus to, when performing the update, calculate the change amount for the competitive games executed until the update condition is satisfied this time after the rating parameter is updated last time, such that the rating parameter of the user is increased if the number of wins is larger than the number of losses.

According to the above configuration example, if the number of wins is larger when the competitive game is executed a plurality of times, the rating parameter is also increased, so that it is possible to make the content of the rating appropriate while ensuring a user's sense of satisfaction.

In another configuration example, the competitive game may be a game in which an ally team including the user and an enemy team including the opponent play against each other.

According to the above configuration example, as for a team competition for which a win-loss result can be changed by a factor other than the user (for example, the action of an ally user), the timing of changing the rating can be the timing when the competitive game is performed a predetermined number of times that is two or more. Accordingly, as compared to the case of changing the rating every competition, it is possible to improve the user's sense of satisfaction and reduce a decrease in motivation for the competitive game. For example, when the user loses a certain competition (due to a factor other than the user), if a decrease in the rating is presented to the user immediately after the competition, there is a concern that the user's motivation may decrease since the impression of loss is still strong in the user's mind. However, after multiple competitions are played, as a result of presenting the change in the rating on the basis of the match record of the multiple competitions played so far as described above, the impression of loss, etc. as described above can also fade, reducing such a motivation decrease. In addition, the change in the rating is presented on the basis of the match record for the multiple times, so that it is expected that it is easier to get a sense of satisfaction from the user.

According to the exemplary embodiments, it is possible to provide a rating system that produces a rating change that is satisfactory to a user.

BRIEF DESCRIPTION OF THE DRAWINGS

FIG. 1 is a block diagram showing a non-limiting example of the internal configuration of a game apparatus 2;

DETAILED DESCRIPTION OF NON-LIMITING EXAMPLE EMBODIMENTS

Figure 2:
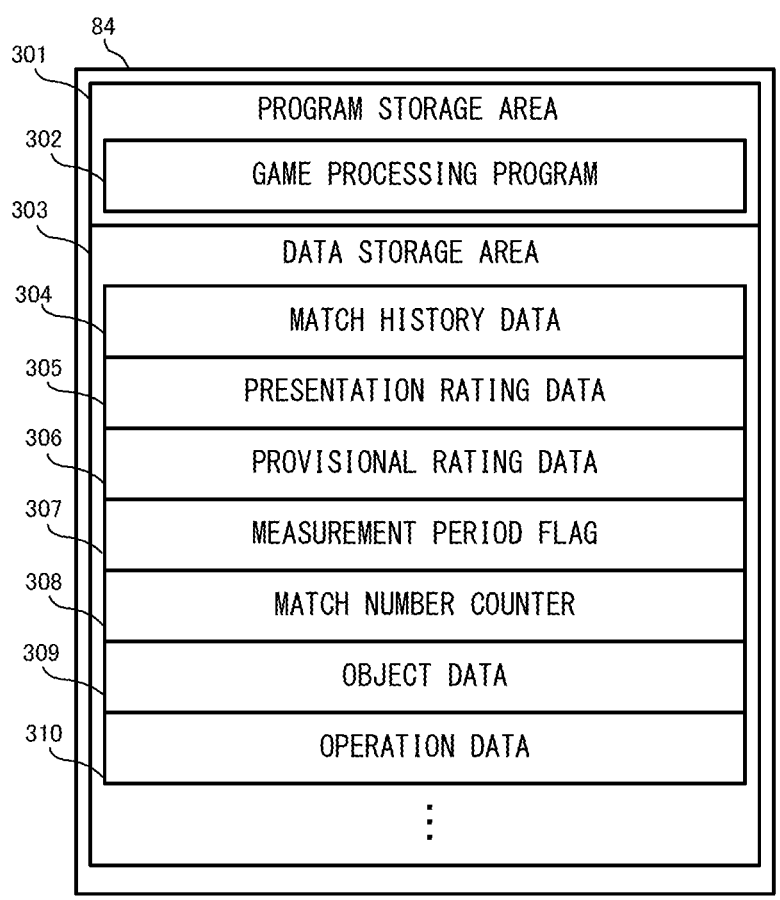
FIG. 2 illustrates a memory map showing a non-limiting example of various kinds of data stored in a storage section 84.

Hereinafter, an exemplary embodiment will be described.

First, an information processing apparatus for executing information processing according to the exemplary embodiment will be described. The information processing apparatus is, for example, a smartphone, a stationary or handheld game apparatus, a tablet terminal, a mobile phone, a personal computer, a wearable terminal, or the like. In addition, the information processing according to the exemplary embodiment can also be applied to a game system that includes the above game apparatus or the like and a predetermined server. In the exemplary embodiment, a stationary game apparatus capable of communicating with another game apparatus will be described as an example of the information processing apparatus.

FIG. 1 is a block diagram showing an example of the internal configuration of a game apparatus 2 according to the exemplary embodiment. The game apparatus 2 includes a processor 81. The processor 81 is an information processing section for executing various types of information processing to be executed by the main body apparatus 2. For example, the processor 81 may be composed only of a CPU (Central Processing Unit), or may be composed of a SoC (System-on-a-chip) having a plurality of functions such as a CPU function and a GPU (Graphics Processing Unit) function. The processor 81 performs the various types of information processing by executing an information processing program (e.g., a game program) stored in a storage section 84. The storage section 84 may be, for example, an internal storage medium such as a flash memory and a dynamic random access memory (DRAM), or may be configured to utilize an external storage medium mounted to a slot that is not shown, or the like.

The game apparatus 2 also includes a controller communication section 86 for the game apparatus 2 to perform wired or wireless communication with a controller 4.

The game apparatus 2 also includes a wireless communication section 85 for the game apparatus 2 to perform wireless communication with another game apparatus 2 or a predetermined server device. As this wireless communication, for example, internet communication or short-range wireless communication is used.

Moreover, a display unit 5 (for example, a television or the like) is connected to the game apparatus 2 via an image/sound output section 87. The processor 81 outputs an image and sound generated (for example, by executing the above information processing) to the display unit 5 via the image/sound output section 87.

[Outline of Game Processing]

Next, an outline of operation of game processing executed by the game apparatus 2 according to the exemplary embodiment will be described. The game processing assumed in the exemplary embodiment is competitive game processing that allows users to play against each other. For example, such a game is a game that allows users to play against each other while wirelessly connecting their game apparatuses 2 to each other using the internet or short-range wireless communication. In the following description, an actual competitive play against an opponent is referred to as a "match" (one competitive play is one match). In addition, a time limit (match time) may be provided for one match. Alternatively, the match may be a sudden death-type match instead of a time limit type. The genre of the game may be any genre (a fighting game, an FPS game, a puzzle game, etc.). However, as the competitive game assumed in the exemplary embodiment, a competitive game in which a rating system using a rating (a parameter for a rating system) which is an index indicating the skill or ability of each user for the competitive game (match) is implemented, is assumed. The processing according to the exemplary embodiment mainly relates to calculation of the rating. The rating is used for matching an opponent in the competitive game, displaying user ranking, etc., in addition to indicating the ability of each user. Basically, the matching is performed such that users having ratings that are as close as possible are caused to play against each other.

Next, a basic method for increasing or decreasing the rating in the exemplary embodiment will be described. In the exemplary embodiment, when the user wins against an opponent, the rating is increased, and when the user loses to an opponent, the rating is decreased. That is, the user having a higher rating can be inferred to have higher skill and ability for the competitive game. Furthermore, according to the magnitude of the difference in rating from the opponent (hereinafter, referred to as rating difference), an amount of increase/decrease (hereinafter, also collectively referred to as change amount) is also changed. For example, when the user plays against an opponent having a lower rating than the user, if the user wins against the opponent, the rating of the user is increased, and the amount of increase becomes smaller when the rating difference is larger. In addition, if the user loses to an opponent having a lower rating than the user, the rating of the user is decreased, and the amount of decrease becomes larger when the rating difference is larger. Conversely, when the user plays against an opponent having a higher rating than the user, if the user wins against the opponent, the amount of increase also becomes larger when the rating difference is larger. In addition, if the user loses to an opponent having a higher rating than the user, the amount of decrease becomes smaller when the rating difference is larger. That is, if the user wins against an opponent having a higher rating than the user, the rating difference and the change amount are proportional to each other, and if the user loses to an opponent having a higher rating than the user, the rating difference and the change amount are inversely proportional to each other. Moreover, if the user wins against an opponent having a lower rating than the user, the rating difference and the change amount are inversely proportional to each other, and if the user loses to an opponent having a lower rating than the user, the rating difference and the change amount are proportional to each other.

The method for increasing or decreasing the rating is an example, and in another exemplary embodiment, for example, a method, in which the ranking of the user is increased if the user wins, and the ranking of the user is decreased if the user loses, may be used.

Meanwhile, in a conventional competitive game (in which a rating system is implemented), processing in which a rating is updated every match, and the change in the rating is presented to a user, is performed. In this case, with the above-described method for increasing or decreasing the rating, depending on the rating difference from an opponent, the change amount may be excessively small even if the user wins against the opponent. For example, it is considered that, even if the user plays a series of matches against an opponent having a lower rating than the user and wins these matches, if the rating difference from the opponent is large, the change amount for each match may be a slight amount (for example, the rating is increased by only 1). In addition, especially in the case where the content of a change in the rating is presented to the user as a match result every match, even if the user wins a series of matches, the amount of increase in the rating for each match is excessively small, so that the sense of exhilaration and satisfaction about the win may be poor for the user.

In view of the above points, in order to ensure a user's sense of satisfaction, the following method is conceivable. In the method, when the user wins against an opponent, regardless of the rating difference, a certain amount of rating increase for each match is guaranteed, that is, a minimum guaranteed value can be set. For example, in the case where "3" is set as the minimum guaranteed value, even when the rating is increased by only 1 in the above-described method for increasing or decreasing the rating, the rating is increased by at least "3".

However, in the case of the above-described method using the minimum guaranteed value, no matter how much rating difference there is between the user and the opponent, the rating is increased by the minimum guaranteed value, so that there is a possibility that the rating is increased more in steps of the minimum guaranteed value as the user plays more matches. Therefore, in some cases, the rating difference between users having the same ability becomes large, so that there is a possibility that the rating does not function as an index indicating the skill or ability of the user for the competitive game, or its function is diminished. In addition, as a result of performing such a method using the minimum guaranteed value for all the users, the ratings may become high as a whole and inflation may occur in the rating system. From such a point of view as well, the proportion of the aspect of evaluating the ability of the user can be reduced.

Here, for example, the following case is conceivable as an example in which, in the above-described method using the minimum guaranteed value, even though users have the same ability, the rating difference between these users becomes large. First, it is assumed that there are a user A and a user B who have exactly the same ability. In addition, it is assumed that the ratings of both users are 1000. Moreover, as for the change amount of the rating, the minimum guaranteed value is assumed to be "5". With this assumption, as one example, there is a pattern in which, even though users have the same ability, the rating difference between these users becomes large due to the magnitudes of the numbers of matches. This is the case where, for example, for the user A, as a result of winning 20 times against an opponent having much lower ability than the user A, the rating is changed to 1100, and for the user B, as a result of winning 10 times against an opponent having much lower ability than the user B, the rating is changed to 1050. That is, in the case of the above-described method for correcting the rating change amount by using the minimum guaranteed value for each match, even though users have the same ability, the rating difference between these users can become large due to a simple factor of the magnitudes of the numbers of matches.

As another example based on the same assumption, a pattern, in which, even though users have the same ability, the rating difference between these users becomes large due to the matched opponents having different abilities, is conceivable. For example, the following case is conceivable. It is assumed that the user A plays 10 matches against an opponent having the same ability as the user A, and as a result, the winning percentage is 50%, and the rating is maintained at 1000. On the other hand, it is assumed that the user B plays 10 matches against an opponent having much lower ability than the user B, and the winning percentage is 100%. In this case, as a result of continuously gaining the minimum guaranteed value, the rating becomes 1050. That is, in the case of the above-described method for correcting the rating change amount by using the minimum guaranteed value for each match, the rating difference can become large, depending on whether the user is matched with an opponent having the same level of ability as the user, or whether the user is matched with an opponent having lower ability than the user.

Therefore, in the exemplary embodiment, in order to deal with the above problem, a method in which rating update is performed when the user wins or loses a predetermined number of times or more, instead of updating the rating for each match, is used. Specifically, in the exemplary embodiment, control in which the rating is updated every three wins or three losses is performed. Furthermore, a correction process described below is also performed when the update is performed.

More specifically, the following control is performed in a process of updating the rating in the exemplary embodiment.

First, in the exemplary embodiment, in addition to the rating to be presented to the user (the rating described above; hereinafter, referred to as presentation rating), a provisional rating is used as a parameter to be used in an internal process (without being presented to the user). Then, for each match, the above provisional rating is calculated on the basis of the win-loss result and the rating difference from the opponent, for example, by using the above-described method for increasing or decreasing the rating. In addition, the number of wins and the number of losses are counted by using a match number counter. Then, when the counter reaches three wins or three losses, a process of updating the presentation rating by copying the provisional rating to the presentation rating is performed. However, the update is performed after the correction process described below is performed.

First, when three wins are reached, correction is performed such that the change amount of the rating for a series of matches (at least three matches, and at most five matches in the case of "three wins and two losses" or "two wins and three losses", if draws are ignored) from the last update to the time when three wins are reached this time is equal to or larger than a first threshold. Here, the first threshold is assumed to be, for example, "+10". For example, it is assumed that a user having a presentation rating of 2000 has three wins and two losses, and the provisional rating at this time is "2005". In this case, the change amount of the rating is "+5" and falls below the threshold, so that the present state is a state where the change amount of the rating is less than "+10" which is the first threshold. Therefore, in the exemplary embodiment, it is determined to use "+10" (first threshold) as the change amount. Then, a process in which this change amount is applied to correct the provisional rating from "2005" to "2010" and then the presentation rating is updated with the corrected provisional rating, is performed. In other words, the change amount is corrected from "+5" to "+10", and this corrected change amount is used as the change amount of the presentation rating. When three wins are reached, if the change amount is equal to or larger than "+10" as in the case where the provisional rating is, for example, "2015", the above correction is not performed, and the presentation rating is updated with the provisional rating unchanged.

On the other hand, when three losses are reached, correction is performed such that the change amount of the rating for a series of matches from the last update to the time when three losses are reached this time is equal to or smaller than a second threshold. Here, the second threshold is assumed to be, for example, "−10". For example, it is assumed that a user having a presentation rating of 2000 reaches two wins and three losses, and the provisional rating at this time is "1997". In this case, the change amount of the rating is "−3", so that the present state is a state where the change amount of the rating is not equal to or less than "−10" which is the second threshold. Therefore, in the exemplary embodiment, it is determined to use "−10" (second threshold) as the change amount. Then, a process in which this change amount is applied to correct the provisional rating from "1997" to "1990" and then the presentation rating is updated with the corrected provisional rating, is performed. In other words, the change amount is corrected from "−3" to "−10". In this case as well, if the change amount of the provisional rating at the time when three losses are reached is a change amount of "−10" or less, the above correction is not performed, and the presentation rating is updated with the provisional rating unchanged.

The values of the first and second thresholds are examples, and in another exemplary embodiment, different values may be used as appropriate from the viewpoint of game contents or game balance.

As described above, in the exemplary embodiment, the timing of rating update is set to the timing of reaching a predetermined number or more of wins or losses, and the above correction process is further performed. Accordingly, it is possible to make the content of the rating appropriate as an index indicating the ability of the user, while improving the user's sense of satisfaction for the change in the rating. For example, when the rating is increased by "+10" at the timing of reaching three wins, the user considers that the rating corresponds to the fact of having three wins, so that the user easily gets a sense of satisfaction for the rating. In addition, even if the rating is decreased by "−10" when three losses are reached, due to the fact that three losses are reached, the user is easily convinced of the decrease in the rating. Furthermore, compared to the case where the above minimum guaranteed value is changed for each match, the number of matches or the length of playing time can be inhibited from being excessively reflected in the rating. Accordingly, the proportion of the aspect of ability evaluation, which is the original purpose of the rating system, can be prevented from becoming excessively small.

[Details of Game Processing of Exemplary Embodiment]

Next, the game processing in the exemplary embodiment will be described with reference to FIG. 2 to FIG. 7. Hereinafter, the processing regarding the above-described rating update will be mainly described, and the detailed description of other game processing is omitted.

[Data to be Used]

First, various kinds of data to be used in the game processing will be described. FIG. 2 illustrates a memory map showing an example of various kinds of data stored in the storage section 84 of the game apparatus 2. The storage section 84 includes a program storage area 301 and a data storage area 303. In the program storage area 301, a game processing program 302 is stored. In addition, in the data storage area 303, match history data 304, presentation rating data 305, provisional rating data 306, a measurement period flag 307, a match number counter 308, object data 309, operation data 310, etc., are stored.

A part or all of the data to be stored in the storage section 84 may be stored, for example, in a storage section (not shown) of a predetermined server. Then, the necessary data may be acquired from the server when the game processing is executed. For example, the match history data 304, the presentation rating data 305, the provisional rating data 306, the measurement period flag 307, and the match number counter 308 may be stored in the server as "saved data" corresponding to a predetermined user. Then, when the game apparatus 2 performs a so-called login process for the predetermined server, the saved data corresponding to the logged-in user may be acquired, and the competitive game processing may be executed using the saved data.

The game processing program 302 is a program for executing the competitive game according to the exemplary embodiment.

The match history data 304 is data that stores a history (match record) such as match results of the competitive game. Specifically, the match history data 304 includes at least the date and time of a match, an opponent, and a win-loss result. In another exemplary embodiment, in addition to the above, the match history data 304 may include specific scores, replay data for enabling replay of the match (for example, the history of the operation data of the user), etc.

The presentation rating data 305 is data that indicates the above-described presentation rating. In the initial state where no matches have been performed, no value is set in the presentation rating data 305.

The provisional rating data 306 is data that indicates the above-described provisional rating. In the provisional rating data 306 as well, no value is set in the initial state where no matches have been performed.

The measurement period flag 307 is a flag for indicating whether the user is presently in a state of being in a "measurement period". Here, the measurement period will be described. The measurement period is a period from the time when the first match is played to the time when a presentation rating is calculated for the first time. In other words, the measurement period is a period for calculating a presentation rating of the user. In the exemplary embodiment, since the presentation rating is updated at the timing when three wins or three losses are reached, the measurement period is a period of at least three matches and at most five matches (no draw is considered). In the exemplary embodiment, when the measurement period flag 307 is on, it indicates that the present state is during the measurement period, and when the measurement period flag 307 is off, it indicates that the measurement period has ended.

As for the measurement period, in another exemplary embodiment, regardless of the win-loss situation, for example, the period of a predetermined number of matches from the first match, for example, a period of seven matches, may be unconditionally treated as the measurement period.

The match number counter 308 is a counter for determining whether three wins have been reached or three losses have been reached. For example, in the format of "m wins and n losses", the number of wins or the number of losses is added for each match according to the win-loss result. In addition, when the presentation rating data 305 is updated, the match number counter 308 is also reset to "0 wins and 0 losses".

The object data 309 is data regarding various objects to be used in the competitive game, such as a player character object. For example, the object data 309 includes modeling data, image data, motion data, etc., for various objects.

The operation data 310 is data that indicates the contents of operations performed on the controller 4. In the exemplary embodiment, for example, the operation data 310 includes data indicating the operation states of operation sections such as an analog stick and buttons provided to the controller 4. The contents of the operation data 310 are updated in a predetermined cycle on the basis of a signal from the controller 4.

In addition, various kinds of data (audio data, etc.) to be used in the game processing are stored as necessary in the storage section 84.

[Details of Processing Executed by Processor 81]

Next, the competitive game processing in the exemplary embodiment will be described in detail with reference to flowcharts of FIG. 3 to FIG. 7. As described above, processing regarding rating update will be mainly described here, and the detailed description of other game processing is omitted. In addition, for simplification of description, processing in the case of a draw is omitted (no change in the rating is assumed to occur at the time of a draw).

Figure 3:
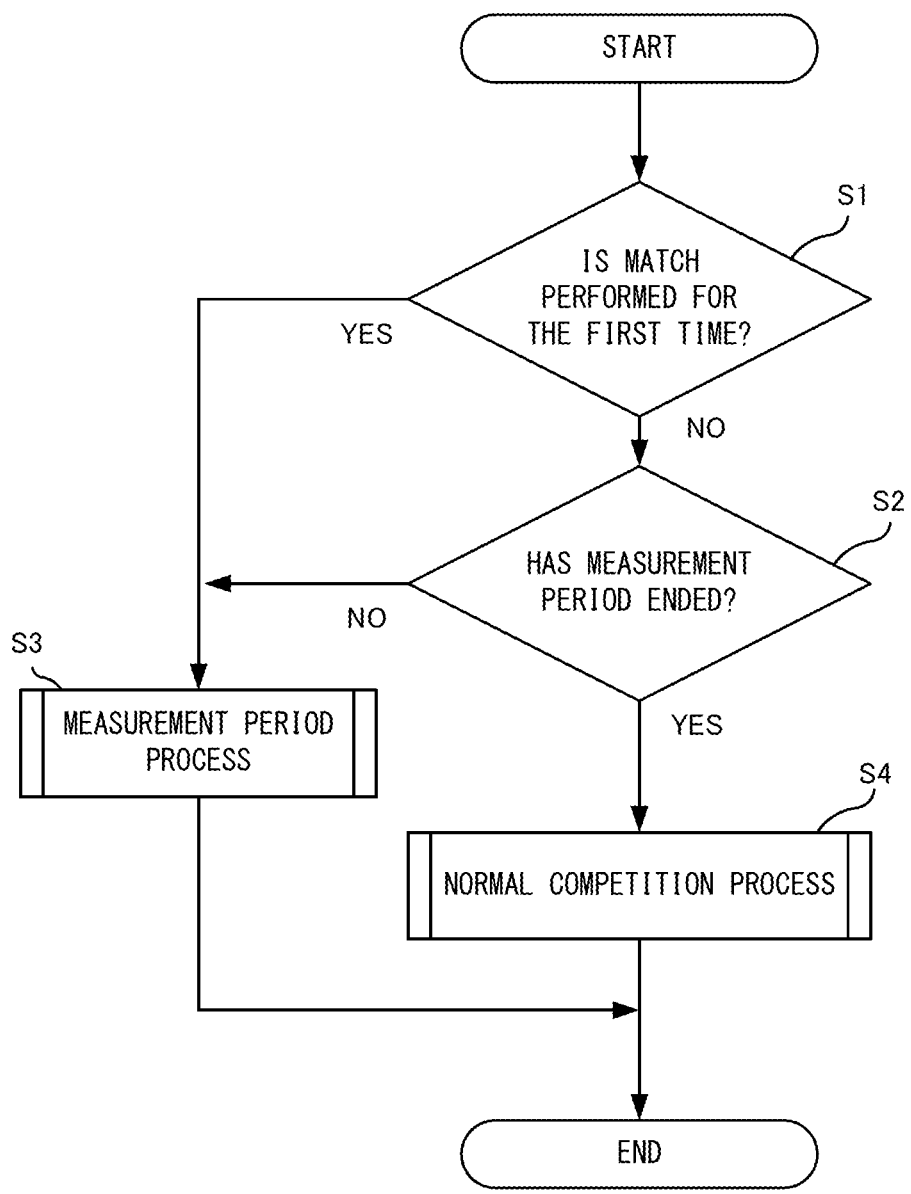
FIG. 3 is a non-limiting example flowchart showing the details of game processing according to an exemplary embodiment.

FIG. 3 is a flowchart showing the details of the competitive game processing. Execution of this processing is started, for example, when the user selects an item of "competitive play" from a predetermined menu.

First, in step S1, the processor 81 refers to the match history data 304 and determines whether the user performs a match (competitive play) for the first time. For example, if no history is stored in the match history data 304, the processor 81 determines that the user performs a match for the first time. As a result of the determination, if the user performs a match for the first time (YES in step S1), the processor 81 executes a measurement period process in step S3. This process will be described later.

On the other hand, if the match is not for the first time (NO in step S1), next, in step S2, the processor 81 refers to the measurement period flag 307 and determines whether the measurement period for the user has ended or the user is presently in a state of being in the measurement period. As a result of the determination, if the measurement period has not yet ended (NO in step S2), the processor 81 executes the measurement period process in step S3. On the other hand, if the measurement period has ended (YES in step S2), the processor 81 executes a normal competition process in step S4. Then, the processor 81 ends the competitive game processing.

[Measurement Period Process]

Figure 4:
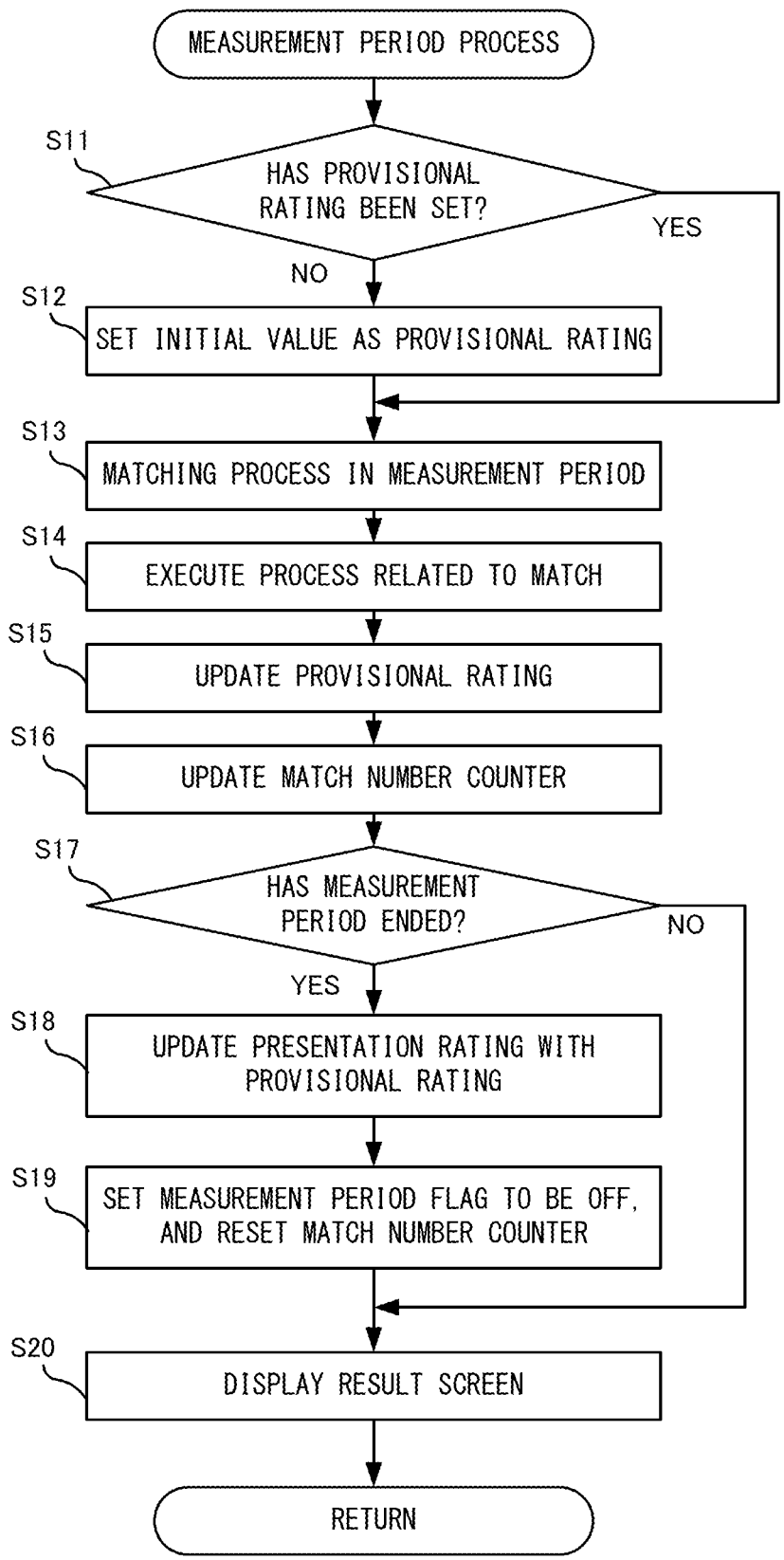
FIG. 4 is a non-limiting example flowchart showing the details of a measurement period process.

Next, the above measurement period process in step S3 will be described in detail. FIG. 4 is a flowchart showing the details of the measurement period process. First, in step S11, the processor 81 determines whether any value is set in the provisional rating data 306. In a state where no matches have been performed, no value is set in the provisional rating data 306, so that the provisional rating data 306 is determined to be unset. As a result of the determination, if the provisional rating data 306 has not yet been set (NO in step S11), in step S12, the processor 81 sets a predetermined value that is defined in advance as an initial value, in the provisional rating data 306. Then, the processor 81 advances the processing to step S13. On the other hand, if the provisional rating data 306 has already been set (YES in step S11), the processor 81 skips the process in step S12 and advances the processing to step S13.

Next, in step S13, the processor 81 executes a matching process in the measurement period. This process is a process for determining an opponent during the measurement period. A specific matching method may be any method, but in the exemplary embodiment, during the measurement period, the above provisional rating is used for matching an opponent. That is, a process in which another user having a rating close to or equal to the provisional rating at that time (in the case of performing a match for the first time, the above predetermined value as the initial value) is matched as an opponent (for example, via a matching server), is executed.

Next, in step S14, the processor 81 executes a process related to a match against the opponent determined in the matching process. Specifically, the processor 81 generates and displays a game screen related to the match, as appropriate. Then, the processor 81 controls the movement of the player character object on the basis of the operation data 310, and controls the movement of an object related to the opponent on the basis of predetermined data received from another game apparatus 2. The process related to the match ends when a time limit elapses or a predetermined win-loss condition becomes satisfied (that is, when the match comes to an end).

Next, in step S15, the processor 81 calculates a change amount of the provisional rating on the basis of the win-loss result of the match and the rating difference from the opponent, and updates the provisional rating data 306. That is, the provisional rating data 306 is updated every match.

Next, in step S16, the processor 81 updates the content of the match number counter 308 as appropriate according to the win-loss result (adding the number of wins or losses).

Next, in step S17, the processor 81 determines whether the measurement period has ended, on the basis of the result of this match. Specifically, the processor 81 refers to the match number counter 308 and determines whether three wins or three losses have been reached. Then, if three wins or three losses have been reached, the processor 81 determines that the measurement period has ended. As a result of the determination, if the measurement period has not ended (NO in step S17), the processor 81 advances the processing to step S20 described later.

On the other hand, if the measurement period has ended (YES in step S17), next, in step S18, the processor 81 updates the presentation rating data 305 with the content of the provisional rating data 306 at that time. Accordingly, the content of the first presentation rating for the user is determined.

Next, in step S19, the processor 81 sets the measurement period flag 307 to be off. Furthermore, the processor 81 also resets the match number counter 308.

Next, in step S20, the processor 81 generates and displays a screen of the match result (hereinafter, result screen). Here, the measurement period is also a period in which the presentation rating is still undetermined. Therefore, while the measurement period flag 307 is on, the processor 81 generates a result screen in which the presentation rating is not displayed. If the measurement period flag 307 is off, the processor 81 generates a result screen in which the presentation rating determined this time is displayed. Then, the measurement period process ends.

[Normal Competition Process]

Figure 5:
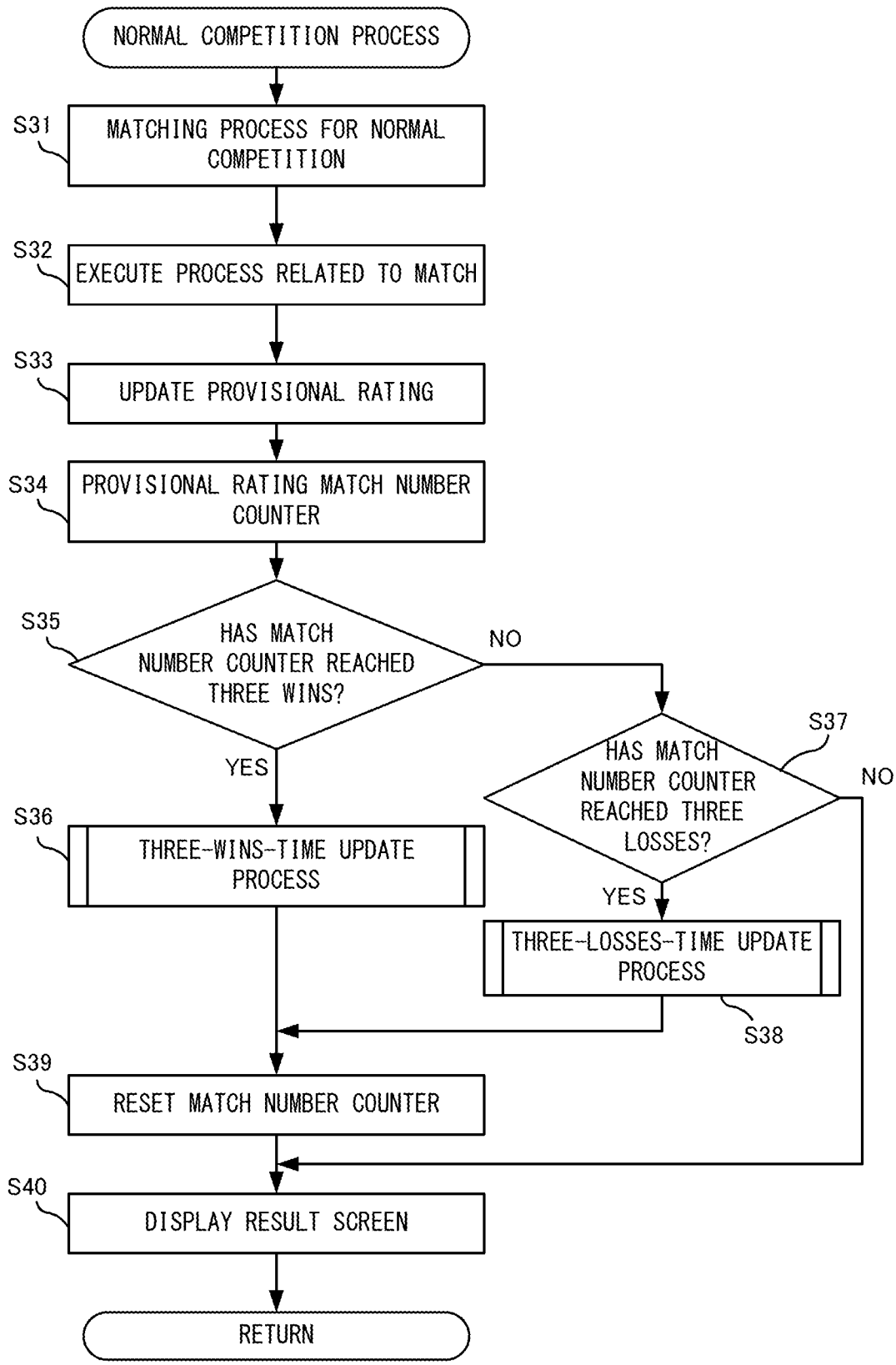
FIG. 5 is a non-limiting example flowchart showing the details of a normal competition process.

Next, the above normal competition process in step S4 in FIG. 3 will be described in detail. This process is a process related to a match played after the end of the measurement period. FIG. 5 is a flowchart showing the details of the normal competition process. In FIG. 5, first, in step S31, the processor 81 executes a matching process for a normal competition. A specific method for the matching may be any method, but in the exemplary embodiment, unlike the case of the measurement period, in the normal competition process, the above presentation rating is used for matching an opponent.

Next, in step S32, the processor 81 executes a process related to a match against the opponent determined in the matching process for the normal competition. This process content is the same as the above process in step S14.

Next, in step S33, the processor 81 calculates a change amount of the provisional rating on the basis of the win-loss result of the match and the rating difference from the opponent, and updates the provisional rating data 306. At the timing when the match number counter 308 is reset, the presentation rating and the provisional rating have the same value, and only the provisional rating is updated every match according to the result of the match until three wins or three losses are reached.

Next, in step S34, the processor 81 updates the content of the match number counter 308 as appropriate according to the win-loss result.

Figure 6:
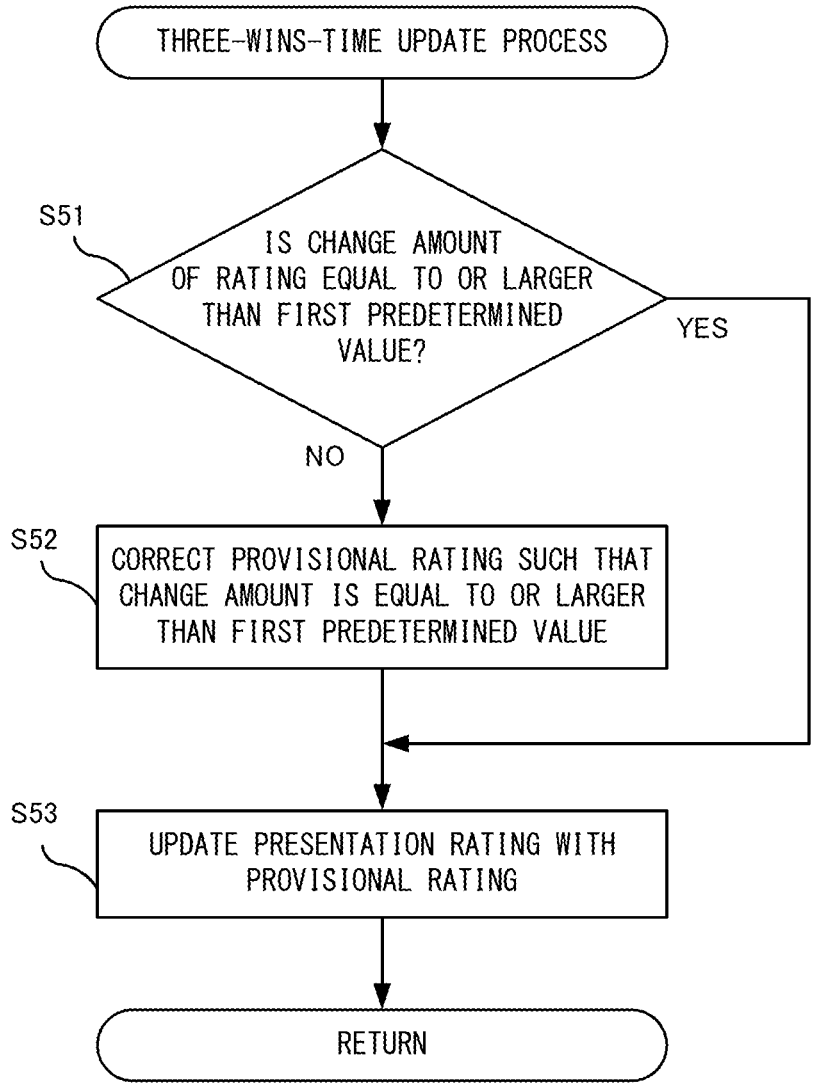
FIG. 6 is a non-limiting example flowchart showing the details of a three-wins-time update process.

Next, in step S35, the processor 81 refers to the match number counter 308 and determines whether the number of wins has reached three. As a result of the determination, if the number of wins has reached three (YES in step S35), in step S36, the processor 81 executes a three-wins-time update process. FIG. 6 is a flowchart showing the details of the three-wins-time update process. In FIG. 6, first, in step S51, the processor 81 determines whether the change amount of the provisional rating from the time when the presentation rating is updated last to this match is equal to or larger than a first predetermined value. For example, the processor 81 calculates the change amount from the presentation rating data 305 (the value is the same as the provisional rating value at the time of last update since update has not yet been performed) to the provisional rating data 306 at the present time. Then, the processor 81 determines whether the change amount (increase amount in this case) is equal to or larger than the first predetermined value. As a result of the determination, if the change amount is not equal to or larger than the first predetermined value (NO in step S51), in step S52, the processor 81 corrects the content of the provisional rating data 306 such that the change amount is (at least) equal to or larger than the first predetermined value. In the exemplary embodiment, the processor 81 corrects the content of the provisional rating data 306 such that the change amount (increase amount) is equal to the first predetermined value. That is, the processor 81 determines the first predetermined value as the change amount, and stores a value obtained by adding the first predetermined value to the presentation rating data 305 at this time, as the provisional rating data 306. Accordingly, the provisional rating data 306 is corrected.

On the other hand, as a result of the determination, if the change amount is equal to or larger than the first predetermined value (YES in step S51), the processor 81 skips the above process in step S52 and advances the processing to the next step. That is, in this case, correction of the provisional rating data 306 is not performed.

Next, in step S53, the processor 81 updates the presentation rating data 305 with the provisional rating data 306. If the provisional rating data 306 has been corrected as described above, the presentation rating data 305 is updated with the value after the correction. This is the end of the three-wins-time update process.

Referring back to FIG. 5, as a result of the determination in step S35, if the match number counter 308 has not reached three wins (NO in step S35), in step S37, the processor 81 determines whether the match number counter 308 has reached three losses. As a result of the determination, if the match number counter 308 has not reached three losses (NO in step S37), it means that the timing of updating the presentation rating has not yet arrived, so that the processor 81 advances the processing to step S40 described later.

Figure 7:
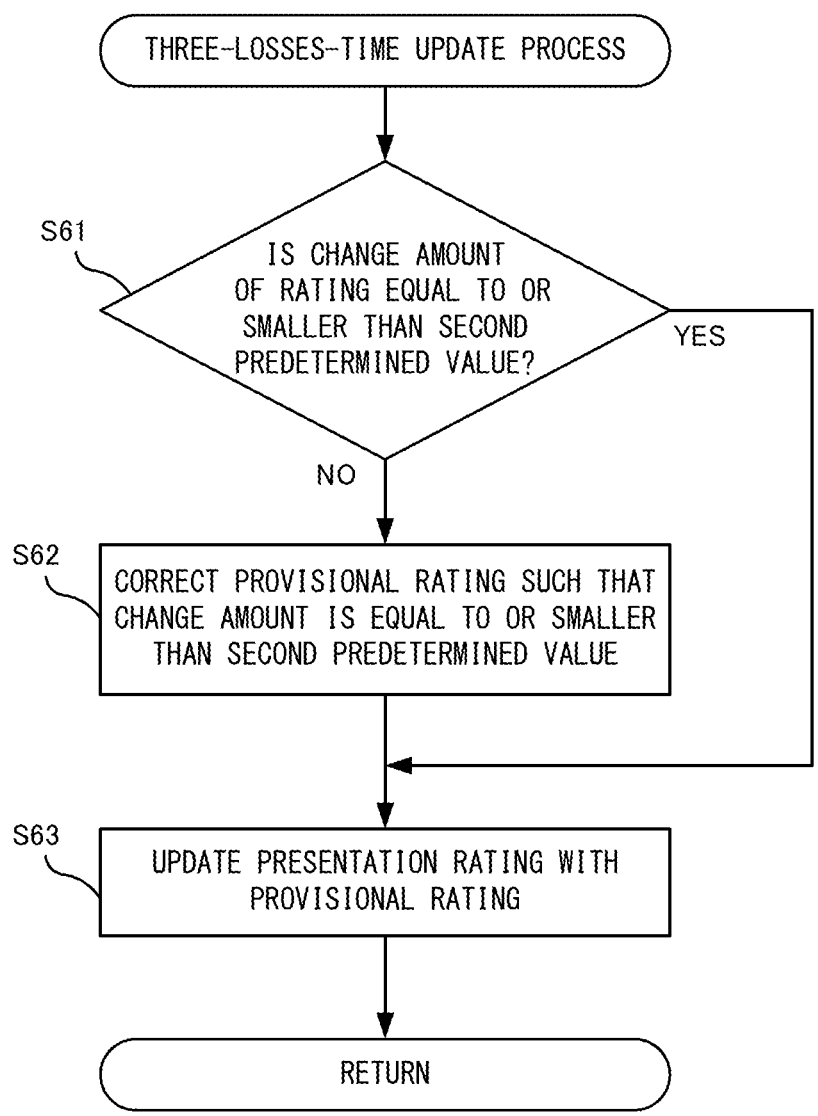
FIG. 7 is a flowchart showing the details of a three-losses-time update process.

On the other hand, if the match number counter 308 has reached three losses (YES in step S37), in step S38, the processor 81 executes a three-losses-time update process. FIG. 7 is a flowchart showing the details of the three-losses-time update process. In FIG. 7, first, in step S61, the processor 81 determines whether the change amount of the provisional rating from the last update of the presentation rating to this match is equal to or smaller than a second predetermined value. For example, the processor 81 calculates the change amount (decrease amount in this case) from the presentation rating data 305 on the basis of the provisional rating data 306 and the presentation rating data 305 at the present time. Furthermore, the processor 81 determines whether this change amount is equal to or smaller than the second predetermined value. As a result of the determination, if the change amount is not equal to or smaller than the second predetermined value (NO in step S61), in step S62, the processor 81 corrects the content of the provisional rating data 306 such that the change amount is (at least) equal to or smaller than the second predetermined value. In the exemplary embodiment, the processor 81 corrects the content of the provisional rating data 306 such that the change amount (decrease amount) is equal to the second predetermined value. That is, the processor 81 determines the second predetermined value as the change amount, and stores a value obtained by subtracting the second predetermined value from the presentation rating data 305, as the provisional rating data 306. Accordingly, the provisional rating data 306 is corrected.

On the other hand, as a result of the determination, if the change amount is equal to or smaller than the second predetermined value (YES in step S61), the processor 81 skips the above process in step S62 and advances the processing to the next step. That is, in this case, correction of the provisional rating data 306 is not performed.

Next, in step S63, the processor 81 updates the presentation rating data 305 with the provisional rating data 306. If the provisional rating data 306 has been corrected as described above, the presentation rating data 305 is updated with the value after the correction. This is the end of the three-losses-time update process.

Referring back to FIG. 5, after the process in step S36 or step S38 ends, next, in step S39, the processor 81 resets the match number counter 308. As a result of resetting the match number counter 308 when three wins or three losses have been reached as described, rating update based on the win-loss result in the period of at least three matches to at most five matches can be performed. In addition, since an odd number of matches that is five matches is used as a break point, if the number of wins is larger than the number of losses in this period, correction can be performed such that the presentation rating is increased. Moreover, if the number of losses is larger than the number of wins in this period, correction can be performed such that the presentation rating is decreased.

Next, in step S40, the processor 81 generates and displays the above result screen showing the match result. In this result screen, until the presentation rating data 305 is updated, the value before the update is shown, and when the presentation rating data 305 is updated, the value after the update is shown. This is the end of the normal competition process.

This is the end of the detailed description of the competitive game processing according to the exemplary embodiment.

As described above, in the exemplary embodiment, the timing of rating update is set to the timing of reaching a predetermined number or more of wins or losses, and the correction process corresponding to the win-loss situation in a series of matches is further performed. Accordingly, it is also possible to prevent the proportion of the aspect of ability evaluation, which is the original purpose of the rating system, from becoming excessively small, while increasing the user's sense of satisfaction for the change in the rating.

Moreover, as in the case of the first match, during the measurement period in which the presentation rating has not yet been determined, matching is performed using the provisional rating, and after the end of the measurement period, matching is performed using the presentation rating. Accordingly, it is possible to perform appropriate matching of users having abilities close to each other.

[Modifications]

As for the match, in another exemplary embodiment, multiple types of matches with different match rules (i.e., multiple match rules) may be prepared. Then, the user may be allowed to select a match rule when performing a competitive play. Then, the match history data 304, the presentation rating data 305, the provisional rating data 306, the measurement period flag 307, and the match number counter 308 may be stored separately for each match rule. That is, for each selected match rule, the above-described processes regarding rating update (determination as to the measurement period, processes when three wins/three losses are reached, etc.) may be executed.

In the above embodiment, the case of "three wins or three losses" has been exemplified as the timing of rating update, but the timing of rating update is not limited thereto. Depending on the game contents, the timing of rating update may be the timing of "two wins or two losses", or a predetermined timing of four or more wins/losses may be adopted. Furthermore, the number of wins and the number of losses do not have to be the same value, and, for example, different values such as "five wins or three losses" may be used for the numbers of wins and losses to be reached. In the exemplary embodiment, the timing of "three wins or three losses" is used in consideration of balance between the length of the match time and the timing when the rating is updated (the rating is presented to the user). That is, the timing of "three wins or three losses" is used from the viewpoint that, if the change in the rating is presented to the user at the timing of at least three matches and at most five matches, a sense of satisfaction for the change can be provided to the user and the change in the rating can be presented with good tempo.

In the above embodiment, as for the provisional rating, the example in which the provisional rating is calculated for each match has been described, but the provisional rating is not limited thereto, and may be calculated collectively for a plurality of matches (for three to five matches in this example) instead of for each match. That is, at the timing of reaching three wins or three losses as described above, the provisional rating may be calculated on the basis of the match record for a series of matches from the last update. In addition, in the case where the provisional rating is calculated collectively for a plurality of matches as described above, a provisional (temporary) change amount for the plurality of matches may be calculated without using the above provisional rating (the concept thereof), the above correction may be performed as appropriate, and then the presentation rating may be updated.

In still another exemplary embodiment, the above-described process may be performed only when the number of wins reaches a predetermined number, or conversely, the above-described process may be performed only when the number of losses reaches a predetermined number. That is, instead of "m wins or n losses", only a condition of either wins or losses may be used for the process.

In the above embodiment, by resetting the match number counter 308 at the timing of three wins or three losses, the parameter update is performed with at most five matches as one period. Therefore, if the number of losses is larger than the number of wins in this period, for example, if there are two wins and three losses, correction can be performed such that the presentation rating is decreased. In this respect, in another exemplary embodiment, for example, even if there are two wins and three losses, correction may be performed such that the presentation rating is increased. For example, if the user wins twice against an opponent having a higher rating than the user and loses three times to an opponent having a higher rating than the user (that is, when all the opponents in five matches have a higher rating than the user), a process in which the presentation rating can be increased even if there are two wins and three losses may be performed. For example, final adjustment may be made in further consideration of the rating difference from the opponent in each match. Conversely, if there are three wins and two losses, similarly, a process in which the presentation rating can be decreased in some cases may be performed.

As for the above matching, in the above embodiment, the example of matching that uses the provisional rating during measurement period, and the presentation rating after the end of the measurement period, such that users of the same level are allowed to play against each other as much as possible, has been described. The matching is not limited thereto, and in another exemplary embodiment, a process in which matching is performed using only the provisional rating or the presentation rating may be performed, or a process in which an opponent is matched completely at random without using any rating may be performed.

As for the number of participants in the competitive game, the competitive game is not limited to a one-on-one competition format, and a competitive play may be performed in a competition format of multiple users versus multiple users, that is, in a competition format of team versus team. In this case, in the above-described matching process, a two-step process of "forming an ally team" and "determining an enemy team (opponents)" may be performed. To give an example of this process, first, a process of forming an "ally team" as a team of two users having the same level, including the user, using the provisional rating (during the measurement period) or the presentation rating (after the end of the measurement period) may be executed. Then, a process of determining an "enemy team" including opponents such that a match is performed between teams having average ratings close to each other, may be executed. Furthermore, the competition format is not limited to a competition format of one team versus one team, and may be, for example, a competition format in which four teams (eight persons in total) play against each other.

In the above embodiment, the example in which the provisional rating is determined on the basis of the match record until a condition for update is satisfied this time after the last update of the presentation rating, has been described. However, in another exemplary embodiment, the provisional rating may be determined on the basis of a factor other than the match record. For example, the provisional rating may be determined on the basis of the ratings of the participants in the match (opponents, or an ally in the case of the above team match). In addition, for example, the history of operation data of the user may be stored in the match history data 304, specific match contents, such as what kind of action the user has made and how often the user has made such action, may be analyzed, and the provisional rating may be determined on the basis of the result of the analysis.

As for the correction of the change amount, the above example shows that the first threshold/second threshold is used as the change amount as it is. However, in another exemplary embodiment, such a threshold itself does not have to be used as the change amount. For example, based on the above-described example, if the provisional rating is less than the first threshold (+10), a predetermined value smaller than the first threshold, for example, "+9", may be determined as the change amount.

In the above embodiment, the case where the series of processes according to the game processing are performed in the single game apparatus has been described. However, in another embodiment, the above series of processes may be performed in an information processing system that includes a plurality of information processing apparatuses. For example, in an information processing system that includes a terminal side apparatus and a server side apparatus capable of communicating with the terminal side apparatus via a network, a part of the series of processes may be performed by the server side apparatus. Alternatively, in an information processing system that includes a terminal side apparatus and a server side apparatus capable of communicating with the terminal side apparatus via a network, a main process of the series of the processes may be performed by the server side apparatus, and a part of the series of the processes may be performed by the terminal side apparatus. Still alternatively, in the information processing system, a server side system may include a plurality of information processing apparatuses, and a process to be performed in the server side system may be divided and performed by the plurality of information processing apparatuses.

In addition, a so-called cloud gaming configuration may be adopted. For example, the game apparatus 2 may be configured to send operation data indicating a user's operation to a predetermined server, and the server may be configured to execute various kinds of game processing and stream the execution results as video/audio to the game apparatus 2.

While the exemplary embodiments have been described in detail, the foregoing description is in all aspects illustrative and not restrictive. It is to be understood that numerous other modifications and variations can be devised without departing from the scope of the exemplary embodiments.

What is claimed is:

1. A computer-readable non-transitory storage medium having stored therein a program to be executed by a game system that includes one or more processors, the program configured to cause at least one of the processors to perform operations comprising:
   storing, for a first participant, a rating parameter;
   executing a plurality of instances of a competitive game that each include the first participant and at least one other participant;
   based on completion of each corresponding instance of the plurality of instances of the competitive game:
   a) updating a tracked counter value for the first participant;
   b) calculating a provisional rating parameter for the first participant based at least in part on 1) a result of the corresponding instance of the competitive game, 2) any prior instances of the plurality of instances that have been completed, and 3) the stored rating parameter;
   determining whether the tracked counter value satisfies at least one update condition, wherein the at least one update condition includes at least one of: 1) the tracked counter value indicating two or more wins in the competitive game, and 2) the tracked counter value indicating two or more losses in the competitive game;
   based on determination that the tracked counter value satisfies the at least one update condition, updating the rating parameter; and
   performing match making for the first participant for each of the plurality of instances of the competitive game, wherein determination of participants to be included in each corresponding instance of the plurality of instances of the competitive game is based on the rating parameter,
   wherein the rating parameter is updated to the provisional rating parameter based on determination that a difference between the provisional rating parameter and the stored rating parameter is equal to or larger than a first threshold, wherein the rating parameter is updated using the first threshold based on determination that the difference between the provisional rating parameter and the stored rating parameter is less than the first threshold.

2. The storage medium according to claim 1, wherein the provisional rating parameter is further based on at least one other rating parameter of the at least one other participant in the corresponding instance of the competitive game.

3. The storage medium according to claim 2, wherein the provisional rating parameter is calculated further based on a difference between the rating parameter of the first participant and the at least one other rating parameter of the at least one other participant.

4. The storage medium according to claim 1, wherein the rating parameter is increased when a number of wins is larger than a number of losses.

5. The storage medium according to claim 1, wherein the competitive game is a game in which an ally team including the first participant and an enemy team including the at least one other participant play against each other.

6. A game apparatus comprising:
a processor and a memory coupled thereto, the processor being configured to control the game apparatus to at least:
store, for a first participant, a rating parameter;
execute a plurality of instances of a competitive game that each include the first participant and at least one other participant;
based on completion of each corresponding instance of the plurality of instances of the competitive game:
a) update a tracked counter value for the first participant;
b) calculate a provisional rating parameter for the first participant based at least in part on 1) a result of the corresponding instance of the competitive game, 2) any prior instances of the plurality of instances that have been completed, and 3) the stored rating parameter;
determine whether the tracked counter value satisfies at least one update condition, wherein the at least one update condition includes at least one of: 1) the tracked counter value indicating two or more wins in the competitive game, and 2) the tracked counter value indicating two or more losses in the competitive game;
based on determination that the tracked counter value satisfies the at least one update condition, update the rating parameter; and
perform match making for the first participant for each of the plurality of instances of the competitive game, wherein determination of participants to be included in each corresponding instance of the plurality of instances of the competitive game is based on the rating parameter,
wherein the rating parameter is updated to the provisional rating parameter based on determination that a difference between the provisional rating parameter and the stored rating parameter is equal to or larger than a first threshold,
wherein the rating parameter is updated using the first threshold based on determination that the difference between the provisional rating parameter and the stored rating parameter is less than the first threshold.

7. The game apparatus of according to claim 6, wherein the provisional rating parameter is further based on at least one other rating parameter of the at least one other participant in the corresponding instance of the competitive game.

8. The game apparatus according to claim 7, wherein the provisional rating parameter is calculated further based on a difference between the rating parameter of the first participant and the at least one other rating parameter of the at least one other participant.

9. The game apparatus according to claim 6, wherein the rating parameter is increased when a number of wins is larger than a number of losses.

10. The game apparatus according to claim 6, wherein the competitive game is a game in which an ally team including the first participant and an enemy team including the at least one other participant play against each other.

11. A game processing method executed by a computer of an information processing apparatus, the game processing method comprising:
storing, for a first participant, a rating parameter;
executing a plurality of instances of a competitive game that each include the first participant and at least one other participant;
based on completion of each corresponding instance of the plurality of instances of the competitive game:
a) updating a tracked counter value for the first participant;
b) calculating a provisional rating parameter for the first participant based at least in part on 1) a result of the corresponding instance of the competitive game, 2) any prior instances of the plurality of instances that have been completed, and 3) the stored rating parameter;
determining whether the tracked counter value satisfies at least one update condition, wherein the at least one update condition includes at least one of: 1) the tracked counter value indicating two or more wins in the competitive game, and 2) the tracked counter value indicating two or more losses in the competitive game;
based on determination that the tracked counter value satisfies the at least one update condition, updating the rating parameter; and
performing match making for the first participant for each of the plurality of instances of the competitive game, wherein determination of participants to be included in each corresponding instance of the plurality of instances of the competitive game is based on the rating parameter,
wherein the rating parameter is updated to the provisional rating parameter based on determination that a difference between the provisional rating parameter and the stored rating parameter is equal to or larger than a first threshold,
wherein the rating parameter is updated using the first threshold based on determination that the difference between the provisional rating parameter and the stored rating parameter is less than the first threshold.

12. The game processing method of claim 11, wherein the provisional rating parameter is further based on at least one other rating parameter of the at least one other participant in the corresponding instance of the competitive game.

13. The game processing method of claim 12, wherein the provisional rating parameter is calculated further based on a difference between the rating parameter of the first participant and the at least one other rating parameter of the at least one other participant.

14. The game processing method of claim 11, wherein the rating parameter is increased when a number of wins is larger than a number of losses.

15. The game processing method of claim 11, wherein the competitive game is a game in which an ally team including the first participant and an enemy team including the at least one other participant play against each other.

16. A game system comprising:
a processor and a memory coupled thereto, the processor being configured to control the game system to at least perform operations comprising:
storing, for a first participant, a rating parameter;
executing a plurality of instances of a competitive game that each include the first participant and at least one other participant;
based on completion of each corresponding instance of the plurality of instances of the competitive game:
a) updating a tracked counter value for the first participant;
b) calculating a provisional rating parameter for the first participant based at least in part on 1) a result of the corresponding instance of the competitive game, 2) any prior instances of the plurality of instances that have been completed, and 3) the stored rating parameter;
determining whether the tracked counter value satisfies at least one update condition, wherein the at least one update condition includes at least one of: 1) the tracked counter value indicating two or more wins in the competitive game, and 2) the tracked counter value indicating two or more losses in the competitive game;
based on determination that the tracked counter value satisfies the at least one update condition, updating the rating parameter; and
performing match making for the first participant for each of the plurality of instances of the competitive game, wherein determination of participants to be included in each corresponding instance of the plurality of instances of the competitive game is based on the rating parameter,
wherein the rating parameter is updated to the provisional rating parameter based on determination that a difference between the provisional rating parameter and the stored rating parameter is equal to or larger than a first threshold,
wherein the rating parameter is updated using the first threshold based on determination that the difference between the provisional rating parameter and the stored rating parameter is less than the first threshold.

17. The game system of claim 16, wherein the provisional rating parameter is further based on at least one other rating parameter of the at least one other participant in the corresponding instance of the competitive game.

18. The game system of claim 17, wherein the provisional rating parameter is calculated further based on a difference between the rating parameter of the first participant and the at least one other rating parameter of the at least one other participant.

19. The game system of claim 16, wherein the rating parameter is increased when a number of wins is larger than a number of losses.

20. The game system of claim 16, wherein the competitive game is a game in which an ally team including the first participant and an enemy team including the at least one other participant play against each other.

21. The game system of claim 16, wherein the tracked counter value includes first and second values that are separately updatable.

* * * * *